Feb. 10, 1931.        H. M. HITCHINS        1,792,303
PROCESS AND APPARATUS FOR STORING EGGS
Filed Dec. 8, 1928
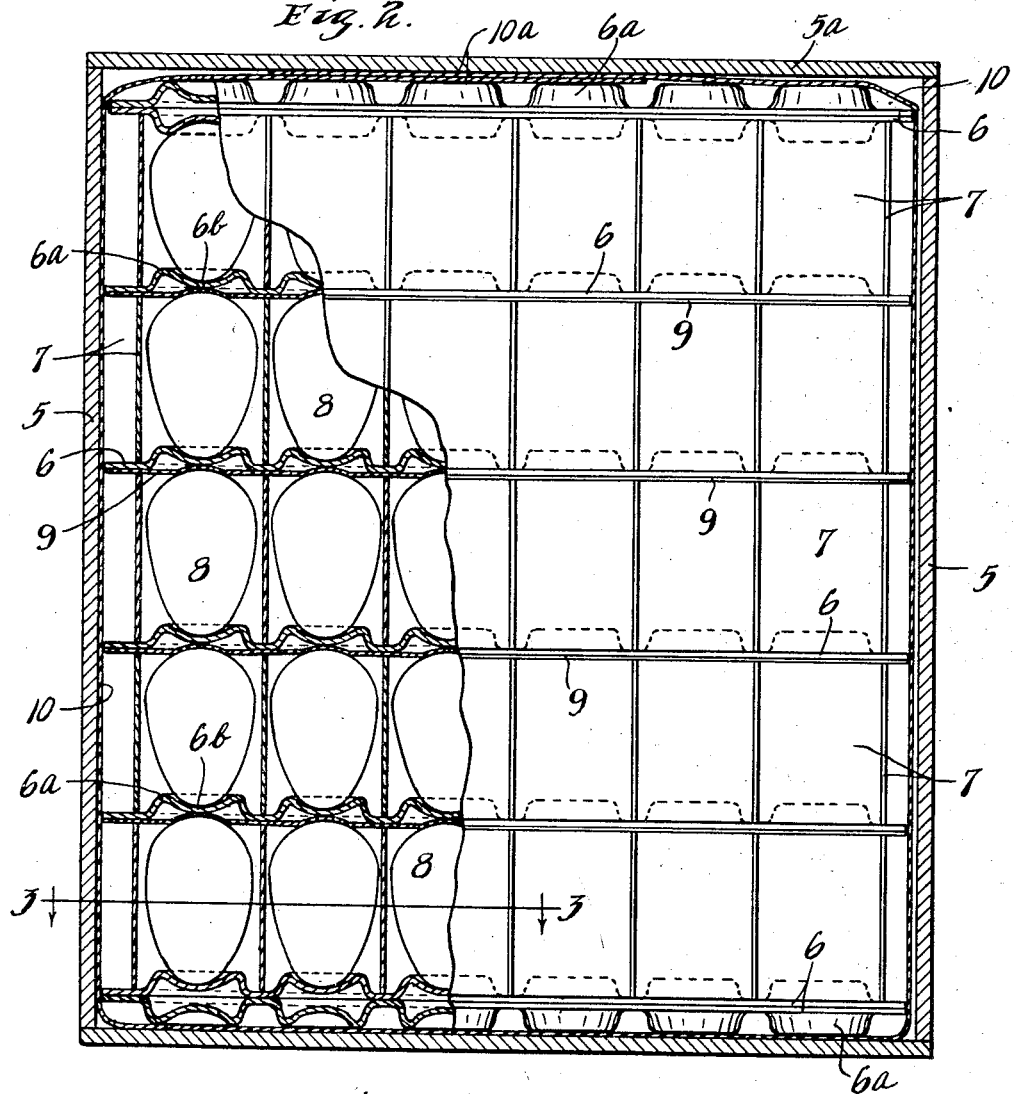
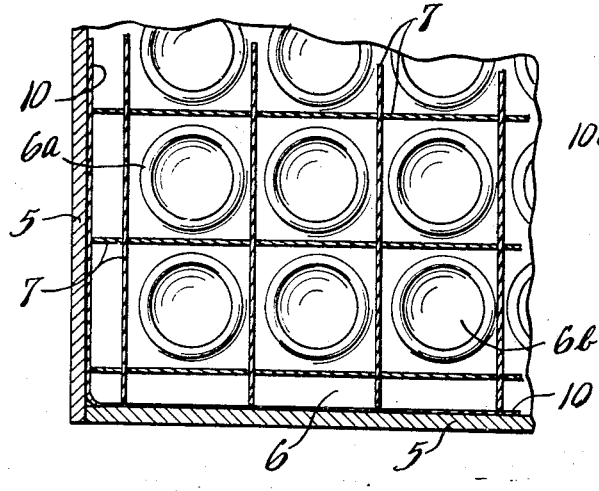
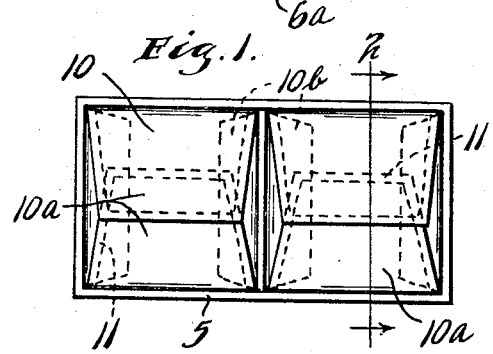
INVENTOR.
HARRY M. HITCHINS.
BY HIS ATTORNEYS Patented Feb. 10, 1931

1,792,303

UNITED STATES PATENT OFFICE

HARRY M. HITCHINS, OF MINNEAPOLIS, MINNESOTA

PROCESS AND APPARATUS FOR STORING EGGS

Application filed December 8, 1928. Serial No. 324,612.

This invention relates to a process and apparatus for keeping eggs. It is now the common practice to pack eggs and place the same in cold storage for several weeks or months. The eggs, after being in cold storage for quite a period, develop more or less of a rancid taste, which is objectionable to most people, and which renders the eggs of lower grade. Eggs are commonly packed in crates, the standard egg crate having two sections, each section comprising a number of layers of eggs contained in a cardboard cellular structure. There is a slight air space in the large end of an egg when it is fresh and the moisture in the egg evaporates continuously as a rule, thus enlarging this air space. There is thus a continual shrinkage of the egg until it is used. It has heretofore been the theory that the eggs must be packed to permit circulation of air. This circulation of air, of course, assists the evaporation of the egg and thus assists in increasing the shrinkage.

Applicant has discovered that the circulation of air is not necessary and that eggs can be stored and kept perfectly sweet and fresh with practically no shrinkage.

It is an object of this invention, therefore, to provide a process and apparatus of storing eggs in which the eggs are enclosed in an air tight envelope.

It is a further object of the invention to provide a process and apparatus of storing eggs in which the large end of the egg is partially covered with a sheet of material impervious to air whereby the shrinkage is prevented.

It is a further object of the invention to provide a package for storing eggs comprising superposed layers of eggs having separating means therebetween, together with an envelope enclosing said layers which envelop is made of air and moisture proof flexible material.

It is still another object of the invention to provide a package for storing eggs comprising a plurality of separated layers of eggs held in proper separating means, a layer of flexible material impervious to air and moisture being disposed on top of each layer.

These and other objects and advantages of the invention will be fully set forth in the following description made in connection with the accompanying drawings, in which like reference characters refer to similar parts throughout the several views, and in which:—

Fig. 1 is a top plan view of a crate of eggs packed in accordance with the present invention;

Fig. 2 is a vertical section taken substantially on line 2—2 of Fig. 1, some parts being broken away to more clearly show the eggs, and Fig. 3 is a partial sectional view taken on line 3—3 of Fig. 2 as indicated by the arrows.

Referring to the drawings, a crate 5 is shown comprising a rectangular box, which is usually made of wood and which, when the eggs are packed, may be provided with a top cover 5a. The crate 5 in general practice, has partitions 5b extending transversely thereof dividing the crate into two substantially equal chambers. These chambers are of a size to receive sheets of material 6 having regularly spaced rows of depressions 6a pressed therein, each depression 6a also having a smaller cup-like depression 6b at the center thereof. In the use of these sheets 6, two of the same are placed at the bottom of the crate as shown in Fig. 1, with their flat sides in contact. The cup sides of one of said sheets will thus be placed against the bottom of the crate and the cup side of the other faces upwardly in the crate. A cellular cardboard structure 7 is then placed on top of the upper layer 6. This structure 7 comprises intersecting rectangular strips of cardboard slotted to be connected with the opposite edges of the strips in parallel planes. When the structure is disposed as shown in Figs. 2 and 3 it comprises a series of vertically extending rectangular chambers. The edges of the strips fit in between the depression 6a as shown in Fig. 2. The eggs 8 are then placed in the chambers of member 7, the small end of the egg being downward and resting in the cup-portions 6b as shown in Fig. 2. The large or upper end of the egg extends slightly into the depression 6a, being substantially in contact with the bottom of the cup 6b. A layer 6 is placed on the bottom row of eggs, the members 7 and 6 are then successively placed for the superposed layers of eggs, an extra sheet 6 being used at the top in reverse relation to the sheet on which it rests, as shown in Fig. 2. The structure so far described is a common form of egg package now widely used.

In accordance with the present invention, a layer of paper 9 is disposed over each layer of eggs immediately under the sheet 6. This paper 9 is of air and moisture proof material, such as a well known wax paper now commonly used. Any flexible kind of air or moisture proof paper can be used.

When the eggs are assembled in each half of the crate, a sack or envelope 10 is placed in position so as to enclose all of the layers including the members 6, 7 and 9. This sack or envelope may of course be placed in the crate before the other parts are placed therein if desired. The sack or envelope 10 will have means at its top such as the overlapping flaps 10a and the smaller side flaps 10b by which it can be sealed. While any kind of sealing means may be used in the embodiment of the invention illustrated the flaps 10b are folded over the top member 6 and then the flaps 10a are folded on top of the flaps 10b in overlapping relation. Adhesive is preferably applied to the edges of the flaps 10a as indicated by the dotted lines 11. When the flaps 10a are thus pasted down an air and moisture tight structure will result.

The sheets 9 are pressed down over the top portion or large portion of the eggs. Said sheets 9 being moisture proof, they effectively seal the top end of the eggs so that there is small chance for any moisture to escape through the shells thereof. In the usual package or crate of eggs the bottom of the depression 6b engages the egg and acts somewhat as a blotter to absorb moisture. This assists the evaporation from the egg. One trouble with storage eggs is that the air space at the end of the egg collects water through a break or puncture of the membrane and a watery (or sloppy) egg results. With applicant's method the four sides of the member 7 surrounding the egg pull the sheet 9 down onto the large end of the egg, sealing the egg as above stated, and centering the egg so that the air space is kept at the top and does not extend down along the side. This prevents the formation of the watery egg. The envelope 10 seals the layers of eggs in one side of the crate so that no circulation of air can take place between the eggs and no moisture can pass through the envelope 10. The eggs are thus kept in fresh condition with practically no shrinkage. Experiments carried out by applicant over a long period of time show that the eggs are preserved in a very fresh condition and have absolutely no rancid or storage taste. The rancid taste or flavor in cold storage eggs is largely due to the eggs having absorbed odors present in the cold storage room. With the air and moisture proof envelope, it is impossible for the eggs to absorb these foreign odors. The air tight envelope about the layers of eggs also assists the insulation and prevents changes of temperature when the cold storage chambers are opened. Contrary to the general belief, the lack of circulation has no adverse effect on the eggs, but on the other hand, has a beneficial effect.

From the above description it is seen that applicant has invented and discovered a simple and efficient method and apparatus for preserving eggs and keeping the same in fresh condition. The apparatus necessary is simple and inexpensive and the eggs can be packed almost as cheaply and rapidly as heretofore. The process and apparatus have been amply demonstrated in actual practice and found to be very successful and efficient.

It will, of course, be understood that various changes may be made in the form, details, arrangement and proportions of the apparatus and in the steps and sequence of steps of the method, without departing from the scope of applicant's invention, which generally stated, consists in a method and apparatus capable of carrying out the objects above set forth, such as disclosed and defined in the appended claims.

What is claimed is:—

1. A package of eggs including superposed layers of eggs, supporting sheets of material disposed between said layers, separating means for said eggs holding the same in vertical position and a sheet of flexible material impervious to air and moisture pressed down on top of each layer of eggs under each one of said first mentioned sheets for covering and sealing the end of each egg.

2. The process of packing eggs for preservation which consists in placing said eggs in separated condition in a layer with their large ends uppermost and sealing the end portion of each egg by placing thereover a sheet of material impervious to air and moisture.

3. A package of eggs comprising spaced layers of supporting sheets of material, layers of eggs disposed between said sheets, separating means for said eggs, a sheet of air and moisture proof material over each layer of eggs and contacting said eggs, and an air and moisture proof envelope surrounding all of said sheets and layers.

4. The process of packing eggs for preservation which consists in placing said eggs in separated condition in layers with their large ends uppermost, sealing the upper end portions of the eggs by placing thereover sheets of material impervious to air and moisture and enclosing the eggs and said sheets in an air- and moisture-proof envelope.

5. A package for eggs including a layer of eggs, means for supporting said eggs and separating said eggs and holding the same in vertical position, and a sheet of material impervious to air and moisture extending over the tops of said eggs and formed with portions fitting over and sealing the top portion of each egg.

In testimony whereof I affix my signature.

HARRY M. HITCHINS.